(12) United States Patent
Liu

(10) Patent No.: US 11,204,625 B2
(45) Date of Patent: Dec. 21, 2021

(54) NOTEBOOK COMPUTER

(71) Applicant: Quanta Computer Inc., Taoyuan (TW)

(72) Inventor: Yi-Chieh Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/038,194

(22) Filed: Sep. 30, 2020

(65) Prior Publication Data

US 2021/0365067 A1 Nov. 25, 2021

(30) Foreign Application Priority Data

May 20, 2020 (TW) .................................. 109116775

(51) Int. Cl.
*G06F 1/16* (2006.01)

(52) U.S. Cl.
CPC .......... *G06F 1/1618* (2013.01); *G06F 1/1649* (2013.01); *G06F 1/1669* (2013.01); *G06F 1/1681* (2013.01)

(58) Field of Classification Search
CPC .... G06F 1/1618; G06F 1/1669; G06F 1/1649; G06F 1/1681
See application file for complete search history.

(56) References Cited

U.S. PATENT DOCUMENTS

| | | | | |
|---|---|---|---|---|
| 5,267,127 A | * | 11/1993 | Pollitt | B41J 5/105 341/20 |
| 8,072,427 B2 | * | 12/2011 | Pletikosa | G06F 1/1622 345/169 |
| 2004/0203517 A1 | * | 10/2004 | Park | H04M 1/0227 455/90.3 |
| 2006/0164799 A1 | * | 7/2006 | Varela | G06F 1/1698 361/679.08 |

FOREIGN PATENT DOCUMENTS

| | | |
|---|---|---|
| CN | 210488375 U | 5/2020 |
| TW | M590259 U | 2/2020 |

* cited by examiner

*Primary Examiner* — Rockshana D Chowdhury

(57) ABSTRACT

A notebook computer includes a connecting portion, a first display screen portion, a hinge structure and a computer mainframe. The first display screen portion has a first display surface. The hinge structure is pivotally connected to the connecting portion and the first display screen portion, respectively. The computer mainframe is slidably disposed on the connecting portion. The computer mainframe is slidable relative to the first display screen portion for alternatively changing arrangement orientations of the computer mainframe relative to the first display screen portion.

8 Claims, 12 Drawing Sheets

NOTEBOOK COMPUTER

CROSS-REFERENCE TO RELATED APPLICATION

This application claims priority to Taiwan Application Serial Number 109116775, filed on May 20, 2020, which is herein incorporated by reference.

BACKGROUND

Technical Field

The present disclosure relates to a notebook computer. More particularly, the present disclosure relates to a notebook computer capable of changing the configuration direction of its computer mainframe.

Description of Related Art

With the advancement of technology, the design of electronic devices also changes rapidly day by day. Normally, one of the electronic devices includes a computer mainframe and a display screen pivotally connected to the computer mainframe by a pivoting mechanism so that the display screen is rotatable relative to the computer mainframe for converting into a notebook status or a tablet status.

However, no matter if the electronic device is converted into the notebook status or the tablet status, since the notebook computer is normally equipped with a keyboard device, the electronic device is not advantageous to downsize its overall volume.

Therefore, how to provide a solution to the electronic device for improving the conversion between the notebook status and the tablet status, but also conforming to current design trends has become a key research to the electronic devices.

SUMMARY

One aspect of the present disclosure is to provide a notebook computer to solve the aforementioned problems of the prior art.

In one embodiment of the disclosure, a notebook computer is provided, and the notebook computer includes a connecting portion, a first display screen portion, a hinge structure and a computer mainframe. The first display screen portion has a first display surface. The hinge structure is pivotally connected to the connecting portion and the first display screen portion, respectively. The computer mainframe is slidably disposed on the connecting portion so that the computer mainframe is slidable relative to the first display screen portion for changing one of arrangement orientations of the computer mainframe relative to the first display screen portion.

According to one or more embodiments of the disclosure, in the foregoing notebook computer, the computer mainframe is formed with a short side and a long side which are adjacent to each other, and the computer mainframe faces towards the hinge structure with the long side of the computer mainframe. When the computer mainframe slides relative to the first display screen portion, the computer mainframe is changed to face towards the hinge structure with the short side of the computer mainframe.

According to one or more embodiments of the disclosure, the foregoing notebook computer further includes a second display screen portion and a pivoting member. The second display screen portion has a second display surface. The pivoting member is respectively pivotally connected to the first display screen portion and the second display screen portion. When the computer mainframe is rotated to the first display surface through the hinge structure, and the second display screen portion is rotated to the first display surface through the pivoting member, the computer mainframe is sandwiched between the first display surface and second display surface.

According to one or more embodiments of the disclosure, in the foregoing notebook computer, the connecting portion includes a plate body, a first curved guide groove and a first sliding post. The plate body and the hinge structure are pivotally connected to each other. The first curved guide groove is formed on one surface of the plate body, and is given with a single curvature. The first sliding post is fixedly connected one surface of the computer mainframe, and slidably received within the first curved guide groove. When the computer mainframe moves the first sliding post to one of two opposite ends of the first curved guide groove, the computer mainframe faces towards the hinge structure with the short side of the computer mainframe.

According to one or more embodiments of the disclosure, in the foregoing notebook computer, the connecting portion further includes a second curved guide groove and a second sliding post. The second curved guide groove is formed on the one surface of the plate body, and is given with another curvature that is different to the single curvature of the first curved guide groove. The second sliding post is fixedly connected the one surface of the computer mainframe, and slidably received within the second curved guide groove.

According to one or more embodiments of the disclosure, in the foregoing notebook computer, the second curved guide groove includes a first arc segment and a second arc segment. The first arc segment has a first circle center. The second arc segment is connected to the first arc segment, and has a second circle center that is different to the first circle center. When the computer mainframe moves the second sliding post to slide along the first arc segment, the computer mainframe is rotated about the first circle center. When the computer mainframe moves the second sliding post into the second arc segment, and to slide along the second arc segment, the computer mainframe is traversely moved relative to the connecting portion so as to rotate about the second circle center.

According to one or more embodiments of the disclosure, in the foregoing notebook computer, the connecting portion further includes an elastic piece and a bump. The elastic piece is provided with a free end and a locking portion. The locking portion is fixedly mounted on the plate body. The bump is located on the free end of the elastic piece, and directly abuts against the computer mainframe. The computer mainframe includes at least one positioned recess formed on the computer mainframe. When the computer mainframe moves the first sliding post to the one of the two opposite ends of the first curved guide groove, the bump is moved into the at least one positioned recess.

According to one or more embodiments of the disclosure, in the foregoing notebook computer, the connecting portion further includes a fixing post and an elastic member. The fixing post is fixedly connected to the connecting portion, and the elastic member is fixedly connected to the first sliding post and the fixing post. When the first sliding post moves to a position between the two opposite ends of the first curved guide groove, the elastic member is compressed to store a resilience that is used to send the first sliding post to the one of the two opposite ends of the first curved guide groove.

According to one or more embodiments of the disclosure, in the foregoing notebook computer, the computer mainframe includes a supporting rib, the connecting portion includes an inserting slot formed on a side of the plate body. When the long side of the computer mainframe faces towards the hinge structure, the supporting rib reaches into the inserting slot to fixedly position the computer mainframe.

According to one or more embodiments of the disclosure, in the foregoing notebook computer, the computer mainframe is supported on the connecting portion by the first sliding post, the second sliding post, and the supporting rib that is located in the inserting slot.

Thus, through the structure of the above embodiments, the disclosure not only lowers the folding size of the electronic device, but also improves the convenience of the conversions between the notebook status or the tablet status, thereby increasing the user's willingness to use.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Figure 1:
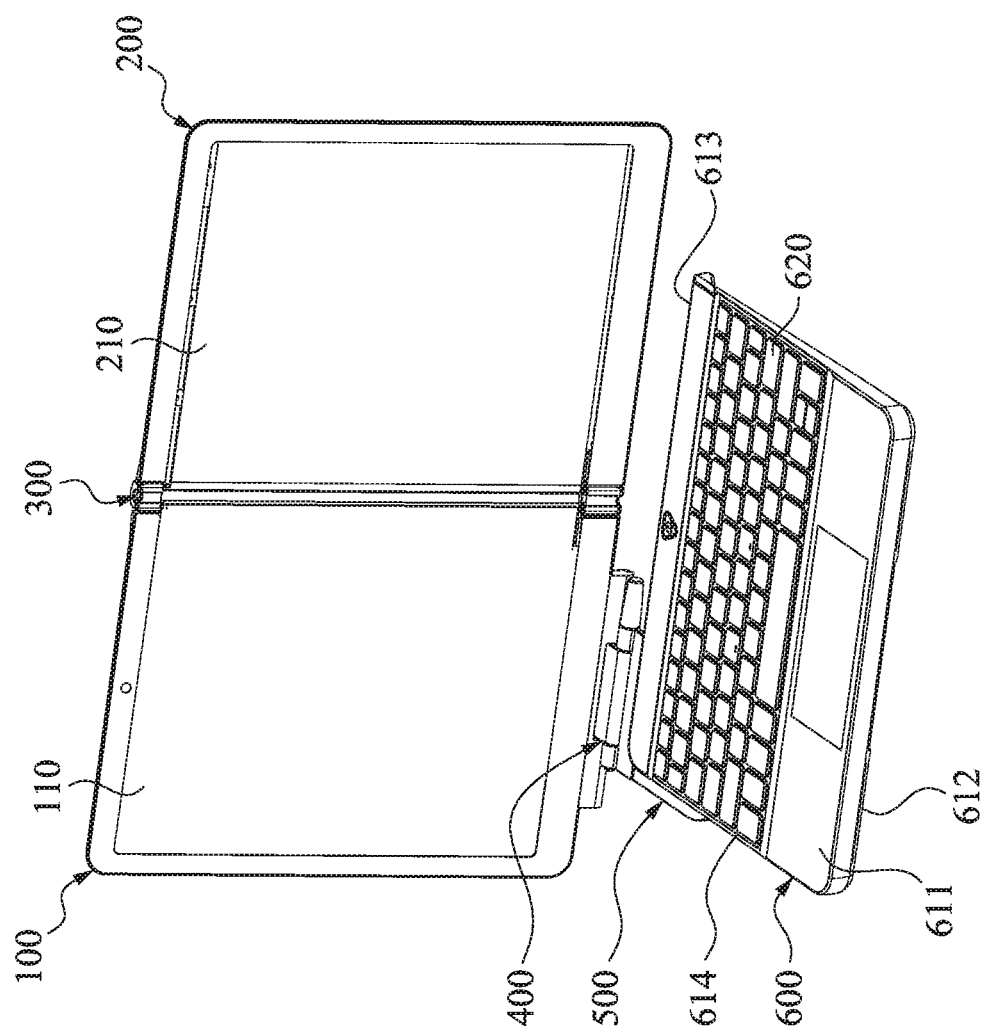
FIG. 1 is a three-dimensional view of a notebook computer according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
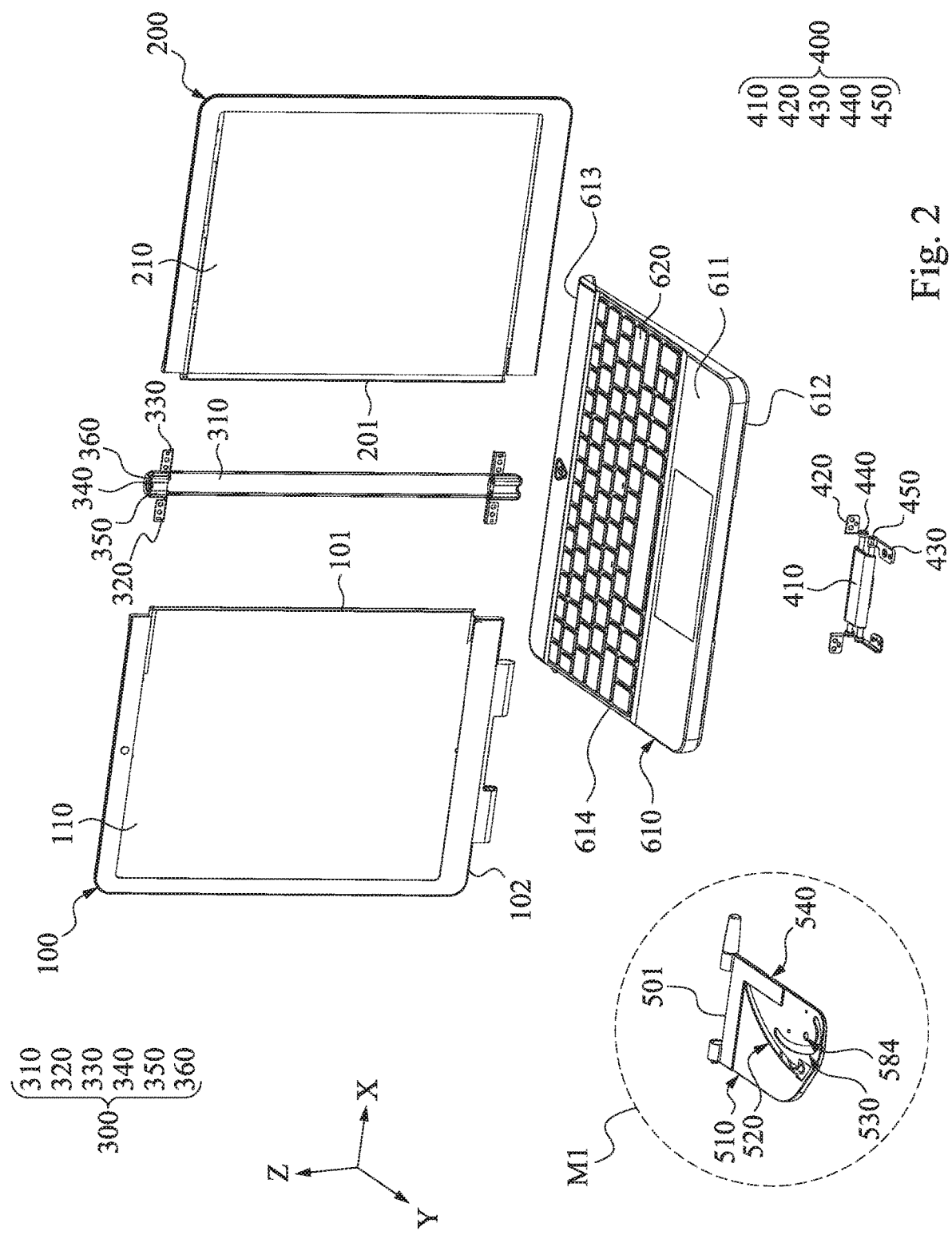
FIG. 2 is an exploded view of the notebook computer in FIG. 1.

Reference is now made to FIG. 1 to FIG. 2 in which FIG. 1 is a three-dimensional view of a notebook computer according to one embodiment of the present disclosure, and FIG. 2 is an exploded view of the notebook computer in FIG. 1. As shown in FIG. 1 and FIG. 2, in one embodiment, the notebook computer 10 includes a first display screen portion 100, a second display screen portion 200, a pivoting member 300, a hinge structure 400, a connecting portion 500 and a computer mainframe 600. The first display screen portion 100 is provided with a first display surface 110. The second display screen portion 200 is provided with a second display surface 210. The pivoting member 300 is located between the first display screen portion 100 and the second display screen portion 200, and is pivotally connected to the first display screen portion 100 and the second display screen portion 200. By turning over the first display screen portion 100 or the second display screen portion 200 through the pivoting member 300, the first display screen portion 100 and the second display screen portion 200 can be superimposed on each other, so that the first display surface 110 faces towards the second display surface 210, or the first display screen portion 100 and the second display screen portion 200 can be arranged side by side, so that the first display surface 110 and the second display surface 210 are coplanar with each other. The computer mainframe 600 is loaded by the connecting portion 500, and the hinge structure 400 is located between the connecting portion 500 and the first display screen portion 100, and the hinge structure 400 is pivotally connected to the connecting portion 500 and the first display screen portion 100. Thus, by overturning the first display screen portion 100 or the connecting portion 500 with the hinge structure 400, the connecting portion 500 is able to rotate the computer mainframe 600 to the first display surface 110, or to one surface of the first display screen portion 100 facing away from the first display surface 110. The computer mainframe 600 is slidably disposed on the connecting portion 500 so that the computer mainframe 600 is slidable relative to the first display screen portion 100 for changing arrangement orientations of the computer mainframe 600 relative to the first display screen portion 100. Exemplarily, one of two adjacent sides (e.g., sides 613 and 614) of the computer mainframe 600 can be faced towards the hinge structure 400 and the first display screen portion 100.

Figure 3:
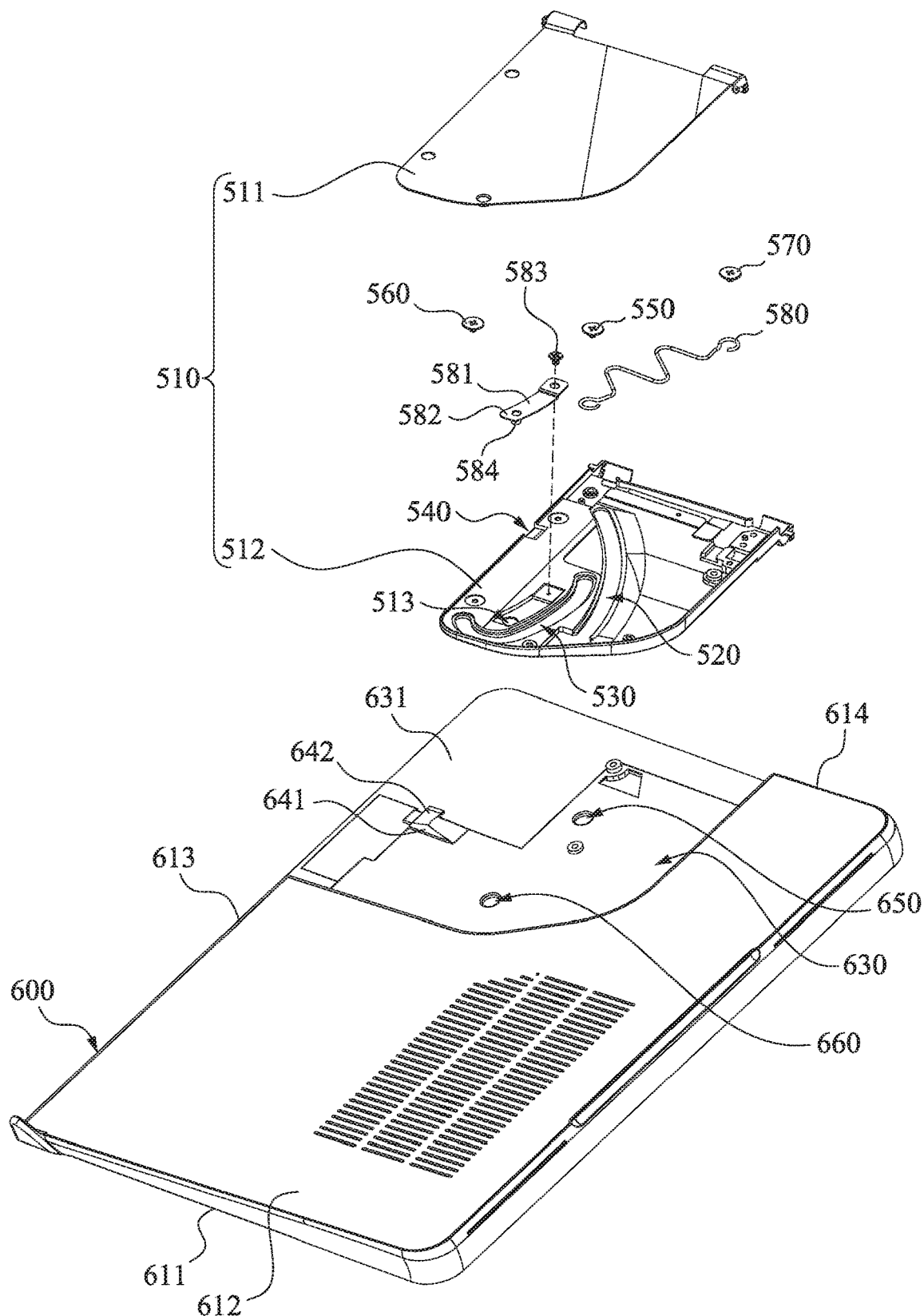
FIG. 3 is an exploded view of a connecting portion located on a computer mainframe in FIG. 2.

For example, please refer to FIG. 1 to FIG. 3 together, the computer mainframe 600 includes a main body 610, a keyboard 620 and a sunken portion 630. The main body 610 is rectangular, and provided with a top surface 611, a rear surface 612, two long sides 613, and two short sides 614. The top surface 611 and the rear surface 612 are opposite to each other, these long sides 613 are opposite to each other, and these short sides 614 are opposite to each other. Each of these long sides 613 is adjacent to these short sides 614, and each of these short sides 614 is adjacent to these long sides 613. The keyboard 620 is disposed on the top surface 611 of the main body 610, the sunken portion 630 is formed on the rear surface 612 of the main body 610, and the connecting portion 500 is disposed within the sunken portion 630 of the computer mainframe 600.

Figure 5A:
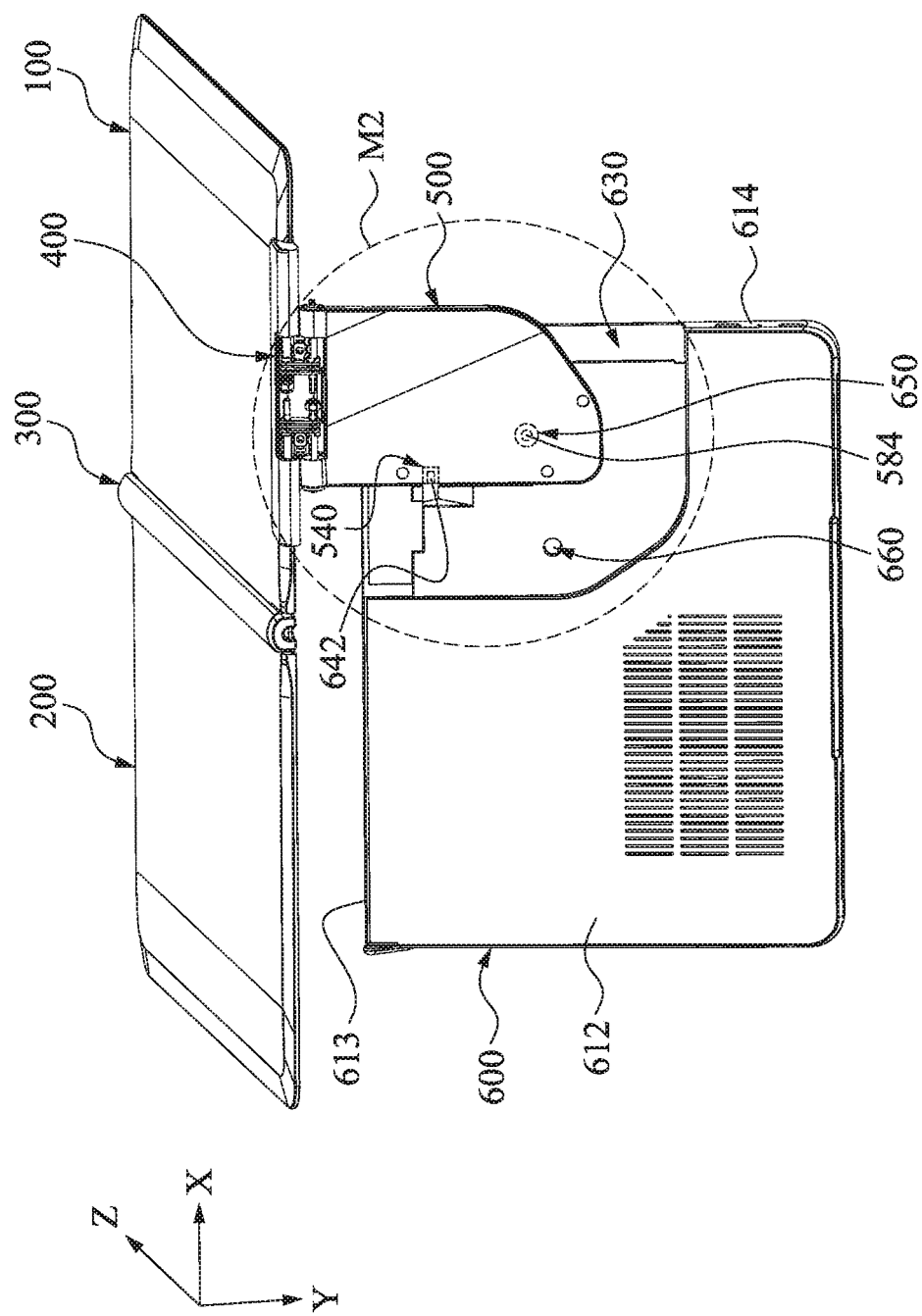
FIG. 5A to FIG. 5E are continual operation views of a notebook computer of FIG. 1 during a folding procedure.
Figure 5B:
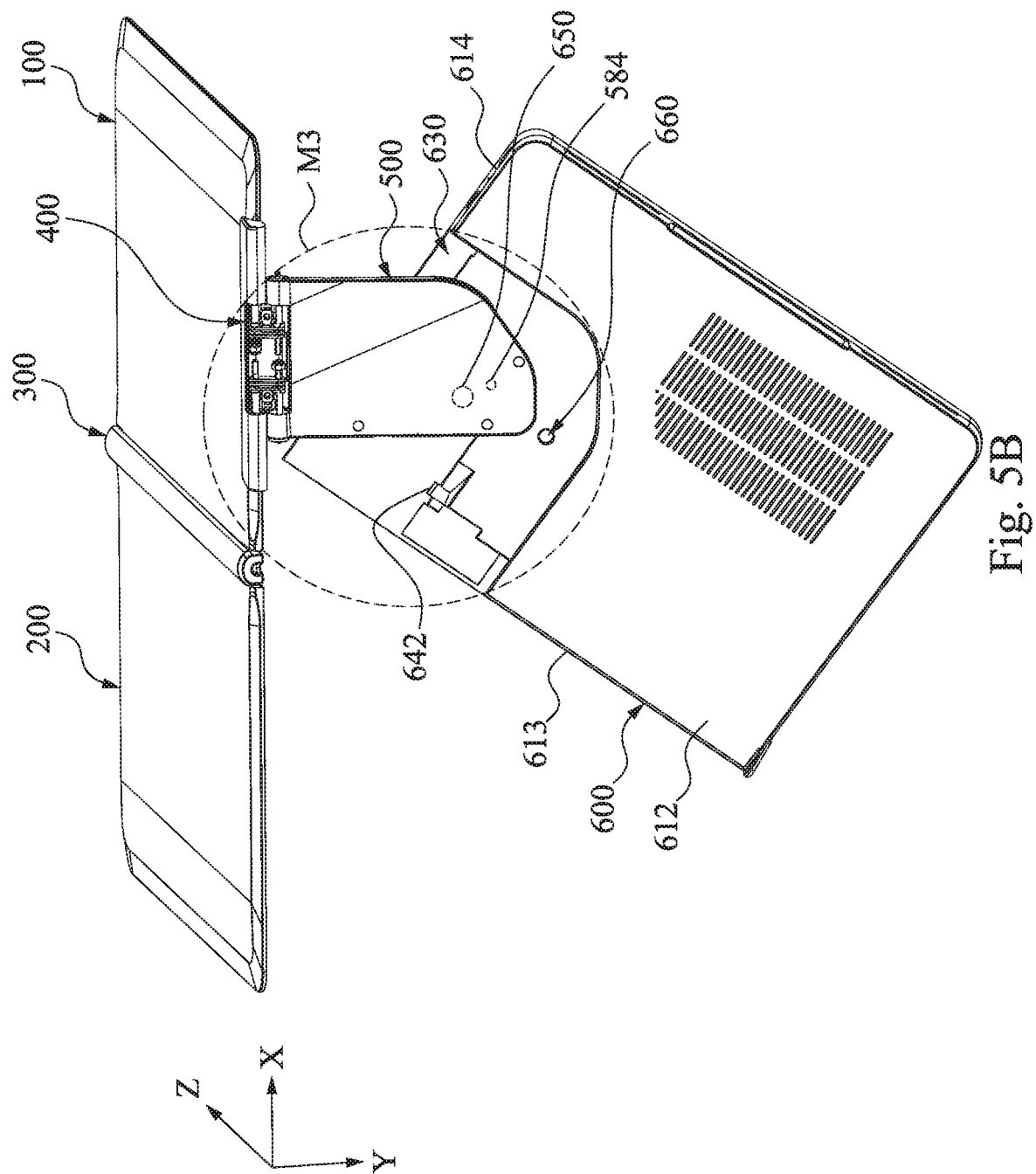
Figure 5C:
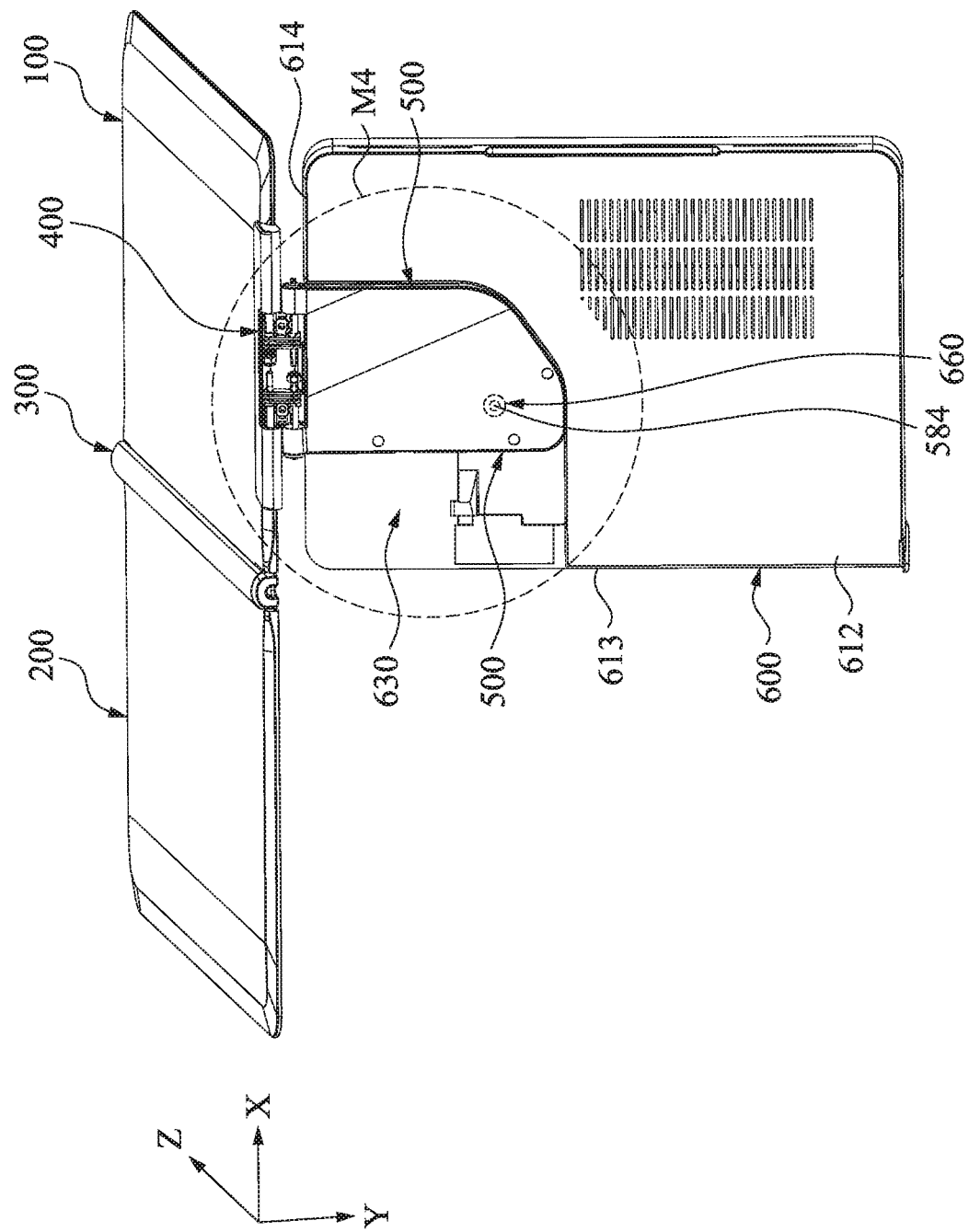

In this way, when a user slides the computer mainframe 600 relative to the first display screen portion 100, the user is able to freely rotate the computer mainframe 600 so that the arrangement orientation of the computer mainframe 600 relative to the first display screen portion 100 can be alternatively changed, that is, the computer mainframe 600 (including the keyboard 620) of the notebook computer 10 is placed transversely so that the long side 613 of the computer mainframe 600 faces towards the hinge structure 400 (e.g., the long axis direction of the computer mainframe 600 is parallel to the X-axis direction, FIG. 1), or the computer mainframe 600 (including the keyboard 620) of the notebook computer 10 is placed straightly so that the short side 614 of the computer mainframe 600 can face towards the hinge structure 400 (e.g., the long axis direction of the computer mainframe 600 is parallel to the Y-axis direction, FIG. 5C).

However, the disclosure is not limited thereto. In other embodiments, the first display screen portion 100 and the second display screen portion 200 may be integrated into a single screen portion.

Specifically, as shown in FIG. 1 and FIG. 2, the pivoting member 300 includes a supporting rod 310, two first brackets 320, two second brackets 330 and two pivot bases 340. The supporting rod 310 is directly disposed between one side 101 of the first display screen portion 100 and one side 201 of the second display screen portion 200. These pivot bases 340 are respectively disposed on two opposite ends of the supporting rod 310. Each of the first brackets 320 is pivotally connected to one side of one of the pivot bases 340, and is secured to the first display screen portion 100 so that the first display screen portion 100 is rotatable relative to the supporting rod 310 through a first pivot shaft 350. Each of the second brackets 330 is pivotally connected to another side of the pivot base 340, and is secured to the second display screen portion 200 so that the second display screen portion 200 is rotatable relative to the supporting rod 310 through a second pivot shaft 360, and the second pivot shaft 360 and the first pivot shaft 350 are in parallel to each other.

The hinge structure 400 includes a pivoting portion 410, two third brackets 420, and two fourth brackets 430. The pivoting portion 410 is located between the first display screen portion 100 and the connecting portion 500. Each of the third brackets 420 is pivotally connected to one side of the pivoting portion 410 through a third pivot 440, and secured to the other side 102 of the first display screen portion 100. Each of the fourth brackets 430 is pivotally connected to the other side of the pivoting portion 410 through a fourth pivot 450 and secured to one side 501 of the connecting portion 500. The third pivot 440 and the fourth pivot 450 (e.g., the X-axis direction) are parallel to each other, and the third pivot 440 is perpendicular to the first pivot shaft 350 (e.g., the Z-axis direction).

Refer to FIG. 3 first, the main body 610 includes a protrusive portion 641 and a supporting rib 642. The protrusive portion 641 is located at the bottom surface 631 of the sunken portion 630, and the supporting rib 642 extends from one side of the protrusive portion 641, and is spaced from the bottom surface 631 of the sunken portion 630. The connecting portion 500 includes an inserting slot 540 at one side thereof. Therefore, when the computer mainframe 600 is sliding to a specific configuration direction, the supporting rib 642 exactly extends into the inserting slot 540 to position the computer mainframe 600 (as shown in FIG. 5A). In this embodiment, when the computer mainframe 600 is placed transversely so that the long side 613 of the computer mainframe 600 faces towards the hinge structure 400, the computer mainframe 600 enables the supporting rib 642 to extend into the inserting slot 540 exactly.

Figure 4:
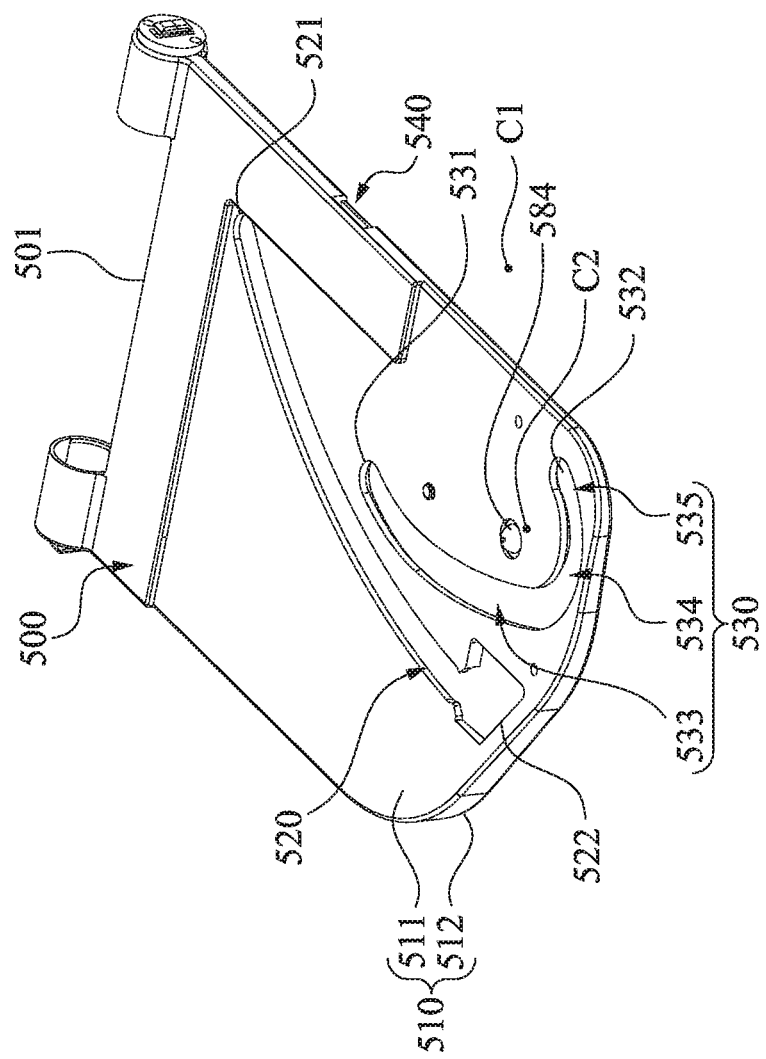
FIG. 4 is a partially enlarged view of an area M1 of FIG. 2.

Refer to FIG. 3 again, FIG. 3 is an exploded view of a connecting portion 500 located on a computer mainframe 600 in FIG. 2, and FIG. 4 is a partially enlarged view of an area M1 of FIG. 2. As shown in FIG. 2 and FIG. 3, the connecting portion 500 includes a plate body 510, a first curved guide groove 520 and a second curved guide groove 530. The plate body 510 and the hinge structure 400 are pivotally connected to each other. In the embodiment, the plate body 510 is in an elongated shape. One end of the plate body 510 is pivotally connected to the hinge structure 400. The first curved guide groove 520 and the second curved guide groove 530 collectively form on one surface of the plate body 510. In the embodiment, the plate body 510 includes a top cover 511 and a bottom cover 512 which are covered with each other. The first curved guide groove 520 and the second curved guide groove 530 collectively form on the bottom cover 512 of the plate body 510, and the fourth bracket 430 is secured on the bottom cover 512 of the plate body 510, and disposed between the top cover 511 and the bottom cover 512.

The first curved guide groove 520 includes a first end 521 and a second end 522. The first end 521 is closer to the hinge structure 400 than the second end 522. The first curved guide groove 520 is given with a single curvature, for example, the profile of the first curved guide groove 520 includes an imaginary arc trajectory with a single curvature having a first circle center C1. The second curved guide groove 530 includes a third end 531 and a fourth end 532. The third end 531 is closer to the hinge structure 400 than the fourth end 532, and between the first end 521 and the second end 522. The curvature of the second curved guide groove 530 is different to the single curvature of the first curved guide groove 520. For example, the profile of the second curved guide groove 530 includes an imaginary arc trajectory given with another curvature that is different to the single curvature of the first curved guide groove.

The connecting portion 500 further includes a first sliding post 550 and a second sliding post 560. The first sliding post 550 and the second sliding post 560 are fixedly connected to the same surface of the main body 610, respectively. The first sliding post 550 is slidably received within the first curved guide groove 520. The second sliding post 560 is slidably received within the second curved guide groove 530. The sunken portion 630 of the computer mainframe 600 receives the connecting portion 500 so that the connecting portion 500 is movable in the sunken portion 630 of the computer mainframe 600.

Specifically, one end of the first sliding post 550 is disposed between the top cover 511 and the bottom cover 512, and is reciprocatedly slidable within the first curved guide groove 520, and the other end of the first sliding post 550 extends outwards from the first curved guide groove 520 and is secured within the sunken portion 630 of the computer mainframe 600. One end of the second sliding post 560 is disposed between the top cover 511 and the bottom cover 512, and is reciprocatedly slidable within the second curved guide groove 530, and the other end of the second sliding post 560 extends outwards from the second curved guide groove 530, and is secured within the sunken portion 630 of the computer mainframe 600.

More specifically, the second curved guide groove 530 includes a first arc segment 533 and a second arc segment 534. The first arc segment 533 has a first circle center C1 substantially the same as the circle center of the first curved guide groove 520. The second arc segment 534 is connected to the first arc segment 533, and has a second circle center C2 that is different to the first circle center C1. When the main body 610 moves the second sliding post 560 to slide along the first arc segment 533, the main body 610 is rotated about the first circle center C1. Next, when the main body 610 continues to move the second sliding post 560 into the second arc segment 534, and slide along the second arc segment 534, the main body 610 is traversedly moved relative to the connecting portion 500 so as to rotate about the second circle center C2.

Furthermore, the second curved guide groove 530 further includes a third arc segment 535. The second arc segment 534 is connected to the first arc segment 533 and the third arc segment 535. The third end 531 is located at the first arc segment 533, and the fourth end 532 is located at the third arc segment 535. The imaginary arc trajectory of the third arc segment 535 is opposite to the imaginary arc trajectory of the first arc segment 533, so that the computer mainframe 600 can be rotated to a preset position, which means that one of the short sides 614 of the computer mainframe 600 can be parallel to the X-axis direction.

It is noted, if the connecting portion 500 is difficult to be appropriately arranged in the sunken portion 630, the computer mainframe 600 rotating around the first circle center C1 is possible to be interfered by the sunken portion 630. Thus, because the main body 610 moves the second sliding post 560 into the second arc segment 534 from the first arc segment 533, the main body 610 can be displaced relative to the connecting portion 500, so that the rotating axle of the main body 610 is traversed to the second circle center C2 from the first circle center C1. Therefore, the main body 610 is rotatable about the second circle center C2, so as not to be interfered by the sunken portion 630.

It is noted, since the first sliding post 550, the second sliding post 560 and the supporting rib 642 located in the inserting slot 540 can jointly support the computer mainframe 600 on the connecting portion 500, the computer mainframe 600 can be supported coplanar on the connecting portion 500.

FIG. 5A to FIG. 5E are continual operation views of a notebook computer of FIG. 1 during a folding procedure. FIG. 6A is a see-through view of an area M2 of FIG. 5A. FIG. 6B is a see-through view of an area M3 of FIG. 5B. FIG. 6C is a see-through view of an area M4 of FIG. 5C. As shown in FIG. 5A and FIG. 6A, when the computer mainframe 600 is placed horizontally to face towards the hinge structure 400 by one of the long sides 613 of the computer mainframe 600, the first sliding post 550 is located at the second end 522 of the first curved guide groove 520, and the second sliding post 560 is located at the fourth end 532 of the second curved guide groove 530 (FIG. 6A).

Next, as shown in FIG. 5B and FIG. 5C, when a user drives the main body 610 to synchronously move the first sliding post 550 to the first end 521 of the first curved guide groove 520, and the second sliding post 560 to the third end 531 of the second curved guide groove 530, the user can turn the computer mainframe 600 so that the computer mainframe 600 faces towards the hinge structure 400 by one of the short sides 614 of the main body 610 (FIG. 6B and FIG. 6C) through the guidance of the first curved guide groove 520 and the second curved guide groove 530.

On the contrary, as shown in FIG. 6C, when the user drives the main body 610 to synchronously move the first sliding post 550 to the second end 522 of the first curved guide groove 520, and the second sliding post 560 to the fourth end 532 of the second curved guide groove 530, the user can turn the computer mainframe 600 so that the computer mainframe 600 faces towards the hinge structure 400 by one of the long sides 613 of the main body 610 (FIG. 5A) through the guidance of the first curved guide groove 520 and the second curved guide groove 530.

Figure 5D:
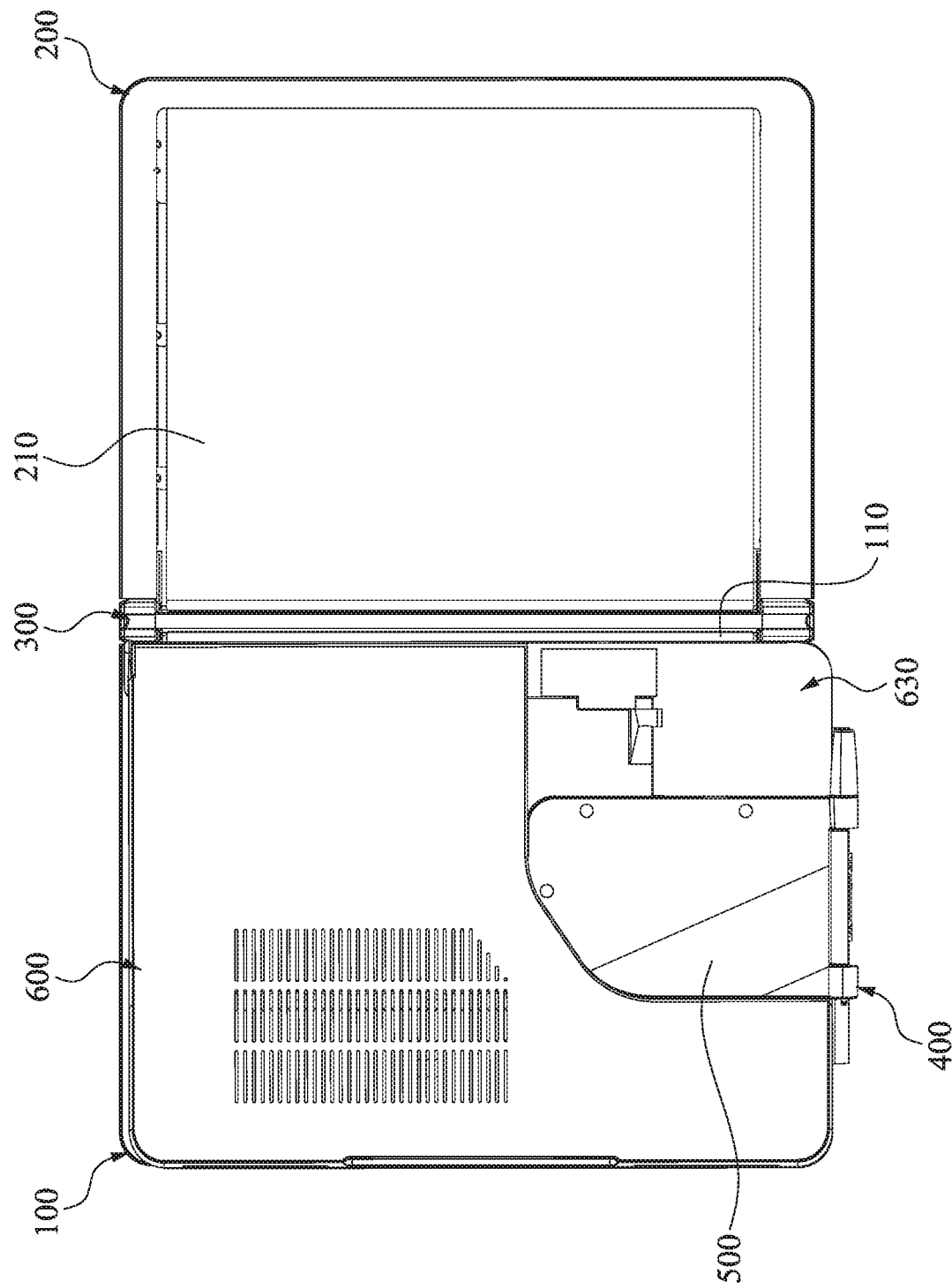
Figure 5E:
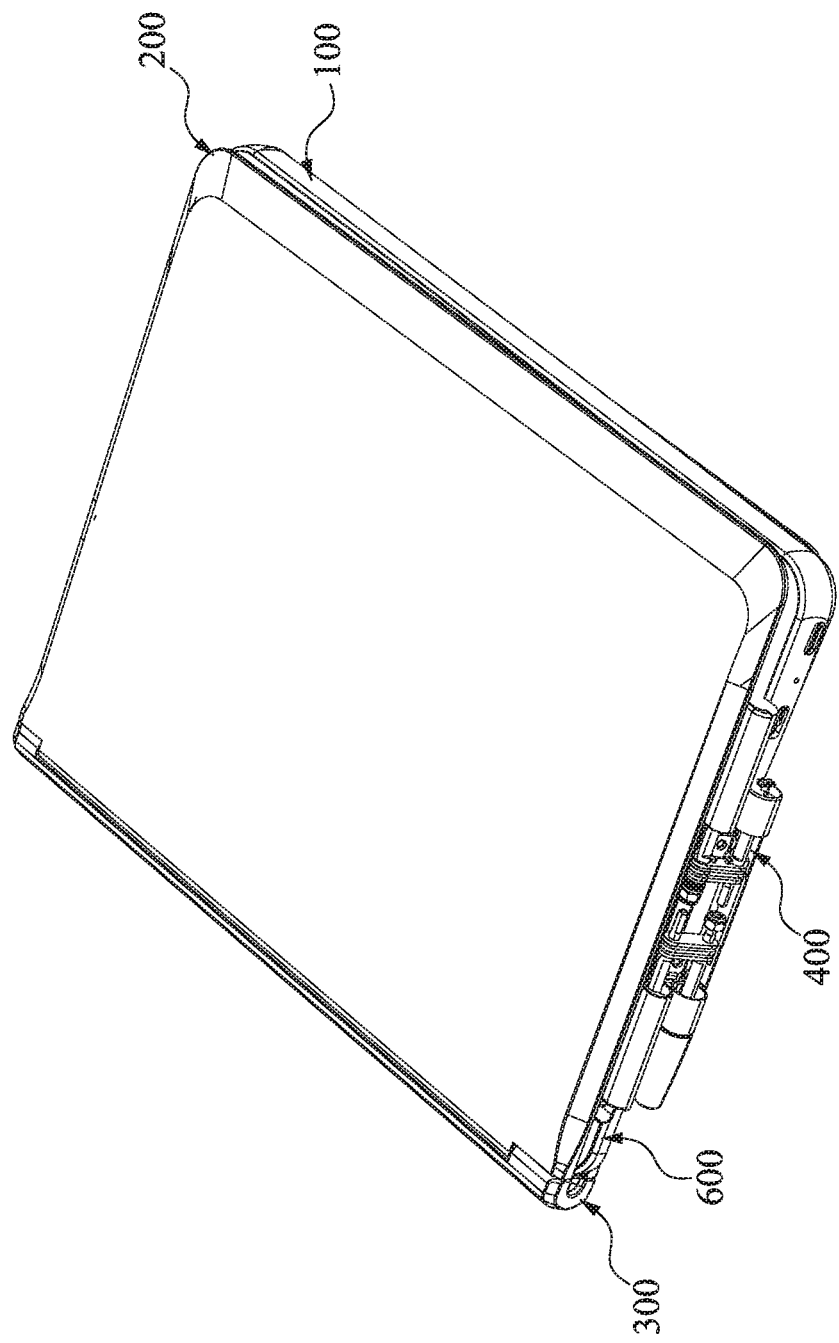
Figure 6A:
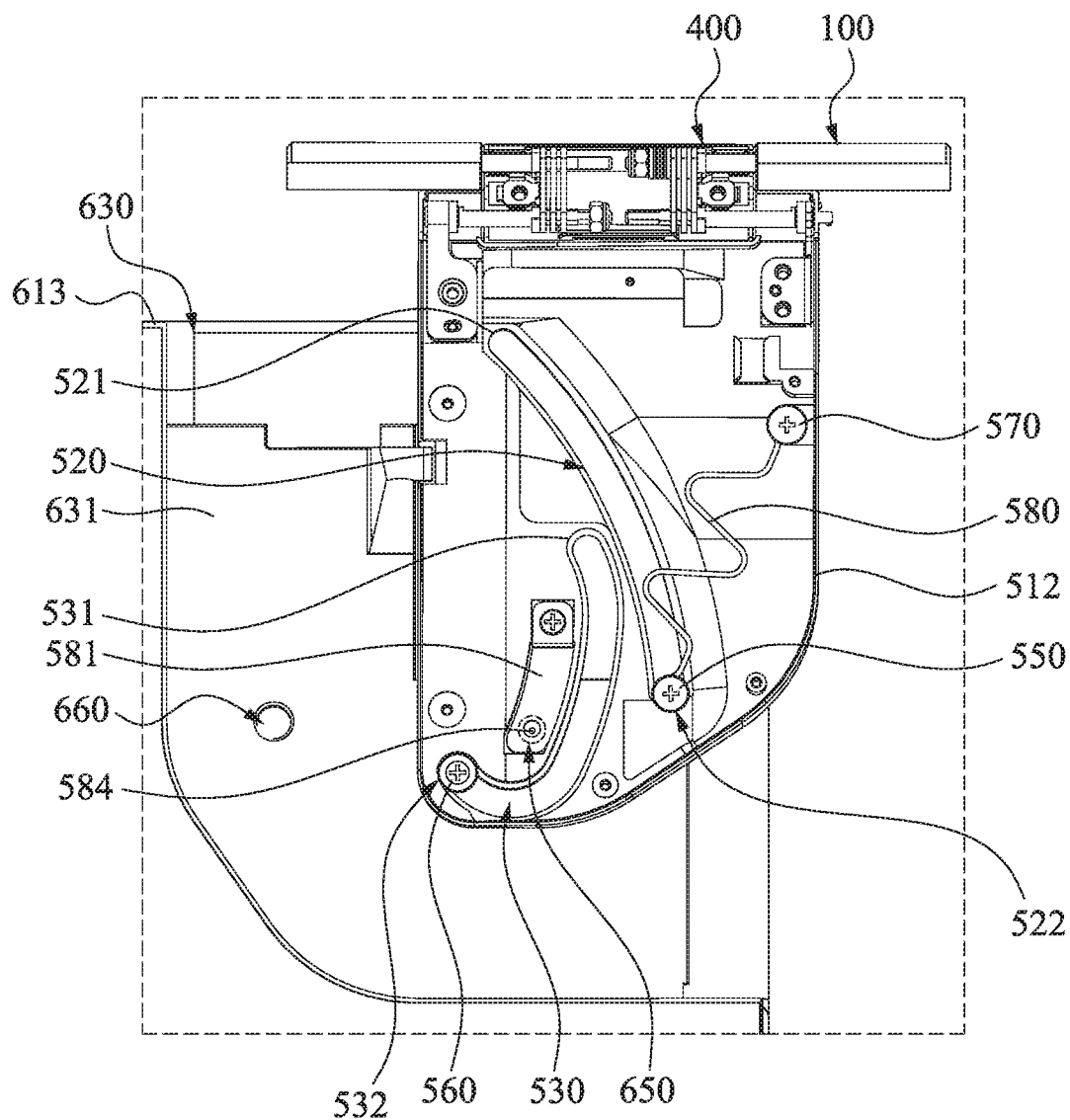
FIG. 6A is a see-through view of an area M2 of FIG. 5A.
Figure 6B:
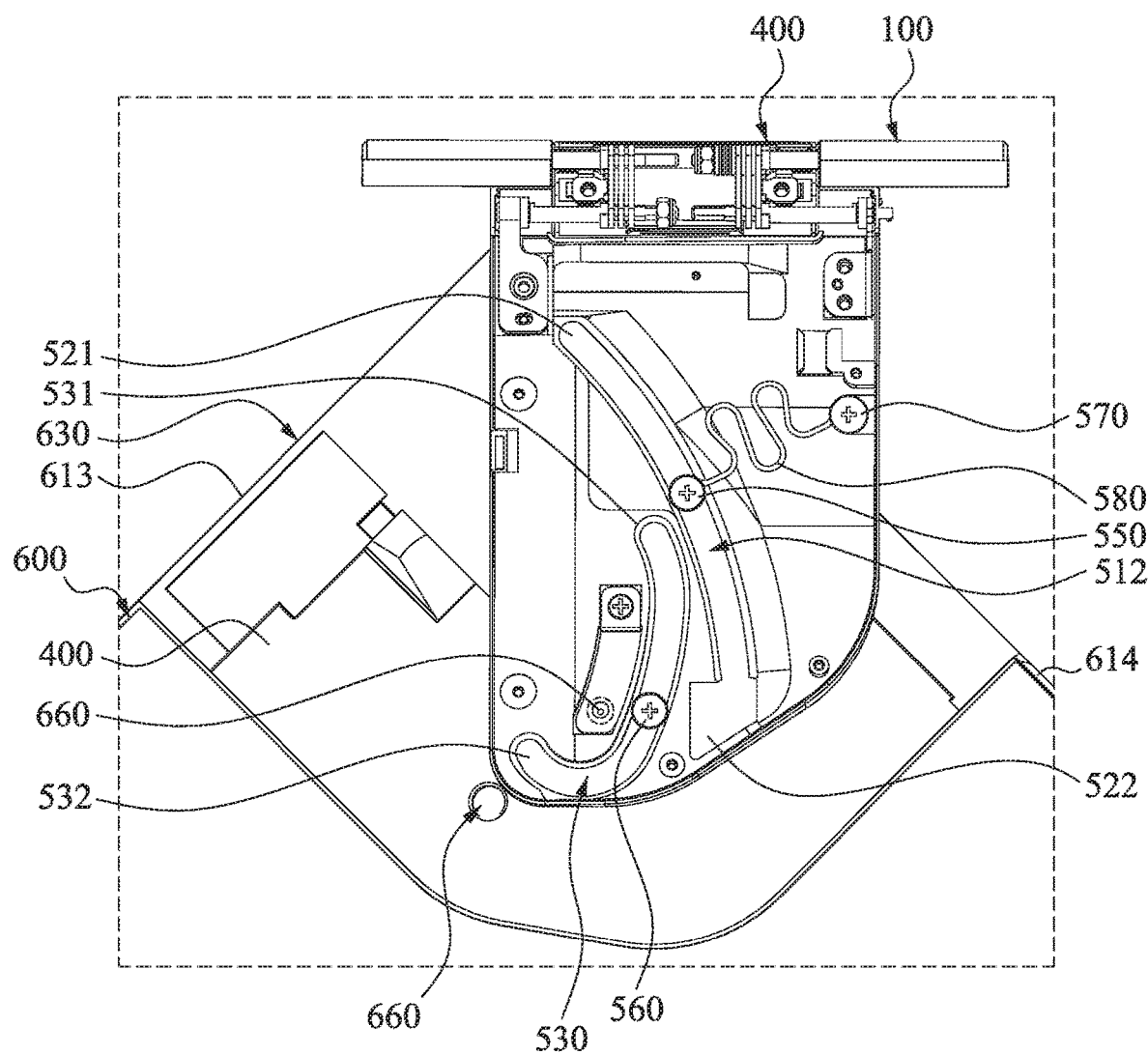
FIG. 6B is a see-through view of an area M3 of FIG. 5B.
Figure 6C:
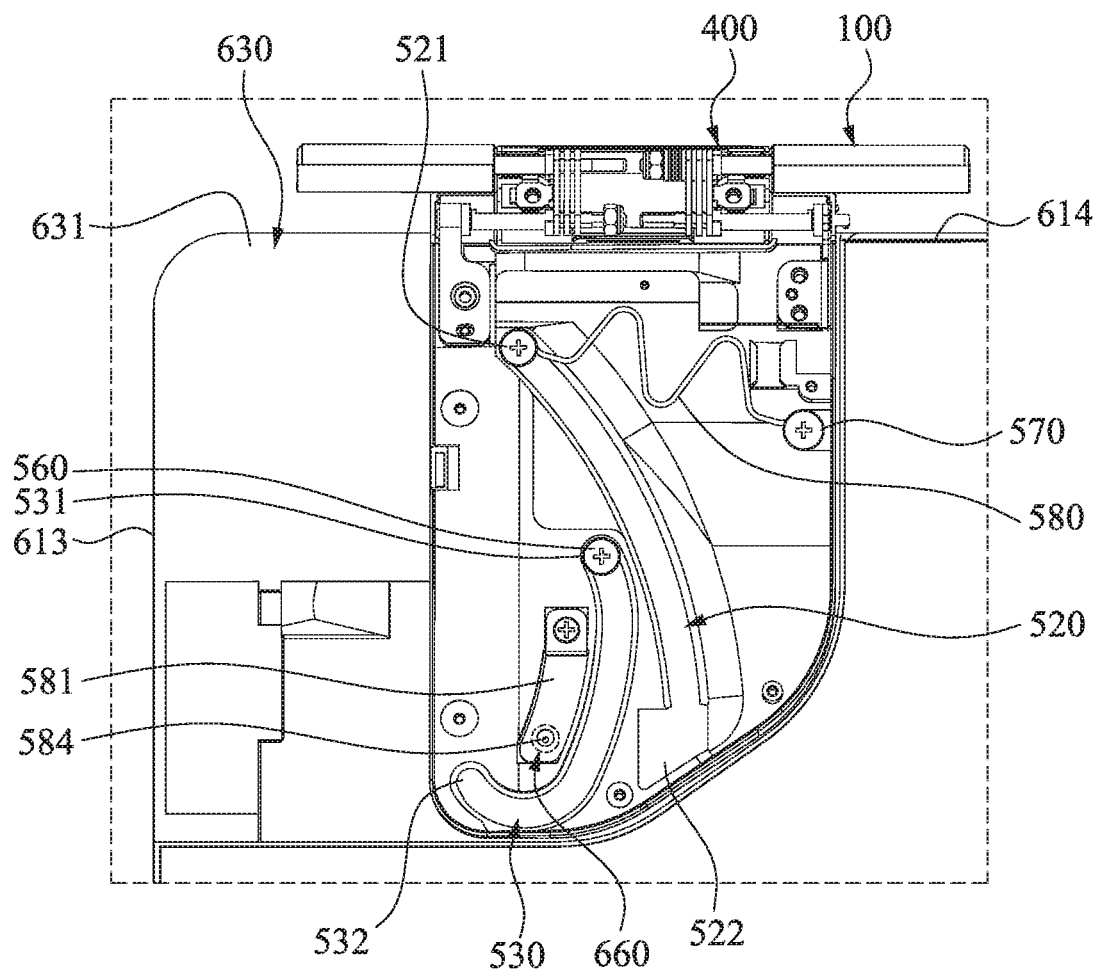
FIG. 6C is a see-through view of an area M4 of FIG. 5C.

Thus, as shown in FIG. 5C to FIG. 5E, when a user is desired to fold the notebook computer 10, the user first places the computer mainframe 600 straight and faces towards the hinge structure 400 by the short side 614 of the computer mainframe 600 (FIG. 5C); next, the computer mainframe 600 is rotated over by using the hinge structure 400 so as to flat place the computer mainframe 600 upon the first display surface 110 of the first display screen portion 100. At last, the second display screen portion 200 is rotated over to face towards the first display surface 110 through the pivoting member 300 so that the computer mainframe 600 is sandwiched between the first display surface 110 and the second display surface 210 (FIG. 5D and FIG. 5E).

In this way, the user can operate the notebook computer 10 with dual screens in a minimization direction so that the user can fold and carry the notebook computer 10.

However, it is noted, in addition to sandwich the computer mainframe 600 between the first display surface 110 and the second display surface 210 (FIG. 5E), the computer mainframe 600 of the disclosure may also be reversely turned on the surface of the first display screen portion 100 facing away from the first display surface 110 through the hinge structure 400 so as to transform into a tablet computer state (not shown in the figures).

Referring back to FIG. 3 and FIG. 4, the connecting portion 500 further includes a fixing post 570 and an elastic member 580. The fixing post 570 is fixedly connected to the connecting portion 500, and the elastic member 580 is fixedly connected to the first sliding post 550 and the fixing post 570. Thus, in the embodiment, the fixing post 570 is secured on the bottom cover 512, and located between the top cover 511 and the bottom cover 512. The elastic member 580 is, for example, a wire spring or a reed. Thus, when the first sliding post 550 moves to a position between the first end 521 and the second end 522 of the first curved guide groove 520, the elastic member 580 is compressed to store a resilience that is used to send the first sliding post 550 back to the first end 521 or the second end 522 of the first curved guide groove 520.

The connecting portion 500 further includes an elastic piece 581 and a bump 584. The elastic piece 581 is provided with a free end 582 and a locking portion 583. The locking portion 583 is fixedly mounted on the plate body 510, and the bump 584 is located on the free end 582 of the elastic piece 581, and directly abuts against the surface of the computer mainframe 600. In the embodiment, the elastic piece 581 is located between the top cover 511 and the bottom cover 512, and secured on the bottom cover 512 by the locking portion 583. The bump 584 protrudes outwards from the bottom cover 512 through a hole 513 of the bottom cover 512, and the resilience of the elastic piece 581 makes the bump 584 to press against the bottom surface 631 of the sunken portion 630. (FIG. 6B)

The computer mainframe 600 includes a first positioned recess 650 and a second positioned recess 660. The first positioned recess 650 and the second positioned recess 660 are concavely formed on a predetermined position on the surface of the computer mainframe 600. Thus, when the computer mainframe 600 is slid along a specific configuration direction, the bump 584 located on the elastic piece 581 can be slid into the corresponding first positioned recess 650 or the second positioned recess 660. In this embodiment, the first positioned recess 650 and the second positioned recess 660 are both concavely formed on the bottom surface 631 of the sunken portion 630.

Therefore, when a user turns the computer mainframe 600 so as to slide the computer mainframe 600 relative to the connecting portion 500, the bump 584 of the elastic piece 581 begins to slide along the bottom surface 631 of the sunken portion 630. After the computer mainframe 600 is turned to exactly face towards the hinge structure 400 by the long side 613 or the short side 614, the bump 584 of the elastic piece 581 can be slid into the corresponding first positioned recess 650 or second positioned recess 660 from the bottom surface 631 of the sunken portion 630. Thereby, not only the arrangement orientations where the computer mainframe 600 being located is positioned, but also a sudden feel and noise can be produced for providing users with a better experience.

Thus, through the structure of the above embodiments, the disclosure not only lowers the folding size of the electronic device, but also improves the convenience of the conversions between the notebook status or the tablet status, thereby increasing the user's willingness to use.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A notebook computer, comprising:
   a connecting portion;
   a first display screen portion having a first display surface;
   a second display screen portion having a second display surface;
   a pivoting member respectively pivotally connected to the first display screen portion and the second display screen portion;
   a hinge structure pivotally connected to the connecting portion and the first display screen portion, respectively; and
   a computer mainframe slidably disposed on the connecting portion, and the computer mainframe formed with a short side and a long side which are adjacent to each other, and the computer mainframe facing towards the hinge structure with the long side of the computer mainframe,
   wherein the computer mainframe is slidable relative to the first display screen portion for changing arrangement orientations of the computer mainframe relative to the first display screen portion,
   when the computer mainframe slides relative to the first display screen portion, the computer mainframe is changed to face towards the hinge structure with the short side of the computer mainframe, when the computer mainframe is rotated to the first display surface through the hinge structure, and the second display screen portion is rotated to the first display surface through the pivoting member, the computer mainframe is sandwiched between the first display surface and second display surface.

2. The notebook computer of claim 1, wherein the connecting portion comprises a plate body, a first curved guide groove and a first sliding post, the plate body and the hinge structure are pivotally connected to each other, the first curved guide groove is formed on one surface of the plate body, and is given with a single curvature, the first sliding post is fixedly connected one surface of the computer mainframe, and slidably received within the first curved guide groove,
   wherein when the computer mainframe moves the first sliding post to one of two opposite ends of the first curved guide groove, the computer mainframe faces towards the hinge structure with the short side of the computer mainframe.

3. The notebook computer of claim 2, wherein the connecting portion further comprises a second curved guide groove and a second sliding post, the second curved guide groove is formed on the one surface of the plate body, and is given with another curvature that is different to the single curvature of the first curved guide groove, the second sliding post is fixedly connected the one surface of the computer mainframe, and slidably received within the second curved guide groove.

4. The notebook computer of claim 3, wherein the second curved guide groove comprises:
   a first arc segment having a first circle center; and
   a second arc segment, connected to the first arc segment, having a second circle center that is different to the first circle center,
   wherein when the computer mainframe moves the second sliding post to slide along the first arc segment, the computer mainframe is rotated about the first circle center,
   when the computer mainframe moves the second sliding post into the second arc segment, and to slide along the second arc segment, the computer mainframe is traversely moved relative to the connecting portion so as to rotate about the second circle center.

5. The notebook computer of claim 2, wherein the connecting portion further comprises an elastic piece and a bump, the elastic piece is provided with a free end and a locking portion, and the locking portion is fixedly mounted on the plate body, and the bump is located on the free end of the elastic piece, and directly abuts against the computer mainframe; and
   the computer mainframe comprises at least one positioned recess formed on the computer mainframe,
   wherein when the computer mainframe moves the first sliding post to the one of the two opposite ends of the first curved guide groove, the bump is moved into the at least one positioned recess.

6. The notebook computer of claim 2, wherein the connecting portion further comprises a fixing post and an elastic member, the fixing post is fixedly connected to the connecting portion, and the elastic member is fixedly connected to the first sliding post and the fixing post,
   wherein when the first sliding post moves to a position between the two opposite ends of the first curved guide groove, the elastic member is compressed to store a resilience that is used to send the first sliding post to the one of the two opposite ends of the first curved guide groove.

7. The notebook computer of claim 3, wherein the computer mainframe comprises a supporting rib, the connecting portion comprises an inserting slot formed on a side of the plate body,
   wherein, when the long side of the computer mainframe faces towards the hinge structure, the supporting rib reaches into the inserting slot to fixedly position the computer mainframe.

8. The notebook computer of claim 7, wherein the computer mainframe is supported on the connecting portion by the first sliding post, the second sliding post, and the supporting rib that is located in the inserting slot.

* * * * *